Jan. 6, 1931.                R. GRUBB                1,788,191
                        AUTOMOBILE HEADLIGHT
                         Filed Dec. 23, 1929
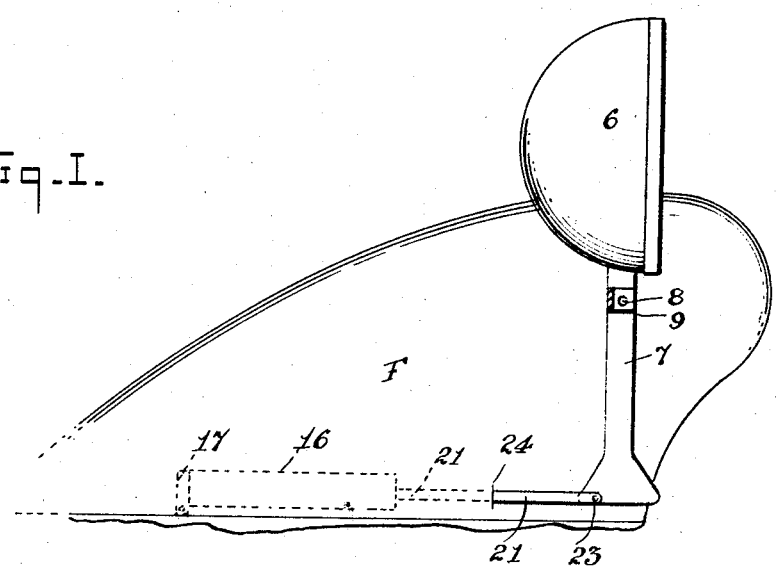
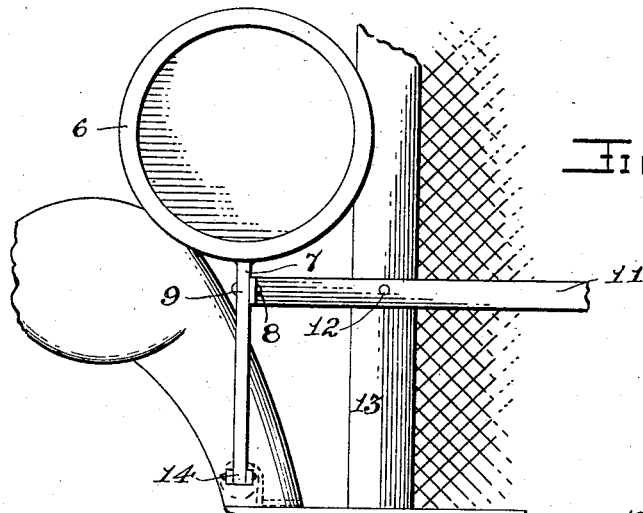
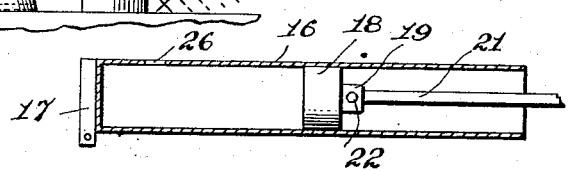
INVENTOR
Reuben Grubb.
BY
Joshua R. H. Potts
ATTORNEY Patented Jan. 6, 1931

1,788,191

UNITED STATES PATENT OFFICE

REUBEN GRUBB, OF PHILADELPHIA, PENNSYLVANIA

AUTOMOBILE HEADLIGHT

Application filed December 23, 1929. Serial No. 415,952.

This invention relates to an automobile headlight and has particular reference to a headlight which will be automatically focused by virtue of the manner in which the same is mounted on the automobile.

The object of the invention is to provide a self-focusing headlight.

A further object of the invention is to provide a headlight which is so mounted that the source of the beam will be controlled so as to prevent swaying of the same.

Still another object of the invention is to provide a headlight capable of being manufactured at a reasonable cost and which may be easily and cheaply attached to new and used automobiles.

According to the invention, the headlight is mounted on a post which is pivotally mounted on an extension bar, said post having a weighted bottom end sufficiently heavy to overcome the weight of the lamp so that the said post will have a tendency to always maintain a vertical position, a dash-pot located to the rear of said post, a piston in said dash-pot and a connecting rod between the bottom of said post and said piston for damping the swinging action of said headlight.

The drawing illustrates an embodiment of the invention and the views therein are as follows:

Fig. 1 is an inside view of the fender taken along the chassis and shows the manner of mounting the headlight thereon, Fig. 2 is a fragmentary view of the front of an automobile showing the manner of mounting the device.

Fig. 3 is a longitudinal sectional view of the dash-pot and piston.

The position of the headlight on the automobile with respect to the fender, radiator, shell etc., is the same as heretofore.

The headlight 6, being mounted on a post 7, which in turn is pivotally mounted at 8 on the right angular extension 9, of a cross bar 11, which is fixed in any suitable manner, such as by rivets or bolts 12 fastened to the radiator shaft 13.

The bottom of the post 7, is weighted as at 14, in order to over-balance the weight of the headlight 6, and so as to maintain the post 7 in a vertical position at all times.

It can be readily seen that if the bottom of the post 14 were allowed to swing when an incline or declivity was reached, the weighted end 14 of the post 7, would swing back and forth and thereby render lighting of the highway very inefficient until such time as the headlight came to rest, and in order to eliminate this swinging action, I have provided means for damping the action of the weighted member which consists of a dash-pot 16, fastened to the chassis or other part of the car by means of the strap 17.

The dash-pot has a piston 18 having a forward extension 19, and a connecting rod 21 is pivotally connected to said extension at 22 and pivotally connected to the weighted lower end of the post 7 at 23.

On account of the contour of the fender which I designate F, it is necessary to cut the same to provide an opening 24 therein so as to allow for the free movement of the connecting rod 21.

The dash-pot is provided with a port 26, through which the air is expelled on the inward movement of the piston 18, and admitted upon the outward movement of said piston.

Of course the self-focusing headlight illustrated may be changed in various ways without departing from the invention herein set forth and hereinafter claimed.

The invention is hereby claimed as follows:—

In a tiltable headlight, the combination with a vehicle embodying an upwardly and outwardly curved fender and a radiator adjacent thereto, a support having a pivot point between the radiator and the fender, a pendulum fulcrumed to said pivot point intermediate the ends of said pendulum and swingable longitudinally between the radiator and the fender, a headlight carried at the upper end of said pendulum above the pivot, a weight forming the lower end of the pendulum below the pivot, a dash pot beneath the fender and a rod extending from the lower end of the pendulum through the fender to the dash pot.

In testimony whereof I have signed my name to this specification.

REUBEN GRUBB.